United States Patent [19]

Bufalov et al.

[11] 4,147,473
[45] Apr. 3, 1979

[54] METHOD OF REGULATING MULTISTAGE AXIAL COMPRESSOR OUTPUT AND AN AXIAL COMPRESSOR FOR CARRYING SAME INTO EFFECT

[76] Inventors: Gimn V. Bufalov, ulitsa Babushkina, 8, kv. 117; Kir B. Sarantsev, Zanevsky prospekt, 43, kv. 69; Gennady I. Bogoradovsky, Bolshoi prospekt, P.S. 61/3, kv. 35; Vladimir I. Titensky, ulitsa Dybenko, 25, korpus 3, kv. 186; Alexei V. Stolyarov, Tovarischesky prospekt, 1, korpus 1, kv. 249; David M. Bavelsky, ulitsa Karbysheva, 4, korpus 1, kv. 137; Alexandr A. Burdin, ulitsa Shelgunova, 43, kv. 15, all of Leningrad, U.S.S.R.

[21] Appl. No.: 756,540

[22] Filed: Jan. 3, 1977

[30] Foreign Application Priority Data

Jan. 4, 1976 [SU] U.S.S.R. .............................. 2307603

[51] Int. Cl.$^2$ ............................................. F04B 49/00
[52] U.S. Cl. ..................................... 417/53; 417/247; 417/405
[58] Field of Search ................... 415/1, 61, 66, 68, 69; 417/247, 351, 408, 405, 423, 53; 60/39, 19

[56] References Cited

U.S. PATENT DOCUMENTS

| 2,194,054 | 3/1940 | Peterson | 417/247 |
| 2,461,931 | 2/1949 | Smith et al. | 415/68 |
| 2,828,066 | 3/1958 | Wellauer | 417/351 |
| 2,960,825 | 11/1960 | Sampietro et al. | 60/39.17 |
| 3,083,893 | 4/1963 | Dean | 417/247 |
| 3,088,414 | 5/1963 | Ozgur | 415/68 |
| 3,767,318 | 10/1973 | Shirato et al. | 415/1 |

FOREIGN PATENT DOCUMENTS

| 576498 | 4/1946 | United Kingdom | 415/68 |
| 586566 | 3/1947 | United Kingdom | 415/68 |
| 596903 | 1/1948 | United Kingdom | 415/68 |

*Primary Examiner*—C. J. Husar
*Attorney, Agent, or Firm*—Robert E. Burns; Emmanuel J. Lobato; Bruce L. Adams

[57] ABSTRACT

A method of regulating the output of a multistage axial compressor having two coaxial rotors in series. The regulation of the compressor output is effected by varying the head of the medium to be compressed, the variation of the head of the medium being effected, after the medium leaves the stator, by changing the rotational speed of the first rotor, the speed of the second rotor being kept constant. The first rotor is connected to a variable-speed drive motor and the second rotor is connected to a constant-speed drive motor.

7 Claims, 3 Drawing Figures

METHOD OF REGULATING MULTISTAGE AXIAL COMPRESSOR OUTPUT AND AN AXIAL COMPRESSOR FOR CARRYING SAME INTO EFFECT

BACKGROUND OF THE INVENTION

The present invention relates to compressor engineering, more particularly, to methods of regulating multistage axial compressor output and to axial compressors designed to carry into effect said methods.

This invention can be used to advantage in axial compressors designed for the following applications:

Compressing atmospheric air to be fed into oxygen plant separation units.

Compressing forced blast to be fed into blast furnaces and other metallurgical objects.

Compressing atmospheric air or air-oxygen mixture to be fed into magnetohydrodynamic generators.

Compressing air or another gas for use in chemical industries.

Compressing gas in other applications where large gas consumption has to be varied over a wide range.

The compressors used in the abovesaid applications must of necessity meet the requirement of providing a wide range of output regulation at a constant delivery pressure. The range of regulation is determined by the process requirements involved and by the need to compensate for seasonal changes in the temperature of the ambient air, amounting to 40–50 percent of the maximum output.

Axial compressors have high capacity and efficiency and, therefore, lend themselves to industrial applications, particularly with a view to the tendency of intensification of production processes and enlargement of the equipment employed. However, the use of axial compressors is hampered by their main disadvantage, viz., the comparatively narrow working range.

In multistage axial compressors the process of gas compression takes place in each stage successively. It is known that the performance of a compressor stage is determined by the flow coefficient which is essentially the ratio of the flow velocity axial component to the rotational speed of the rotor. When the flow coefficient decreases, the angle of incidence and the stage head increase until the angle of incidence reaches the critical value at which stall occurs. This phenomenon sets limitation on the minimum flow through the stage. When the flow coefficient increases, the stage head and the angle of incidence decrease until the stage becomes choked, i.e. the flow coefficient is at the maximum possible value and limits the flow through the stage.

The dimensions of each stage for the design conditions are suited to optimum distribution of the flow coefficients through the stages. Deviation from the design working conditions results in deviation from the desired flow coefficients or, in other words, in mismatching of the compressor stages.

For example, reducing the compressor output with the rotor speed constant causes decrease in the flow coefficient and increase in the first stage head which brings about increase in the pressure and unit weight of the gas at the inlet to the second stage. Consequently, the decrease in the flow coefficient of the second stage is greater than that of the first stage and so forth, the mismatching increasing from stage to stage. The greatest decrease of the flow coefficient is in the last stage where stall conditions cause surge and thereby restrict the reduction of the compressor output.

Increasing the compressor output causes increase in the flow coefficient, decrease in the first stage head and decrease in the pressure and unit weight of the gas at the inlet to the second stage, which causes still further increase in the flow coefficient of the second stage, and so forth. The greatest increase of the flow coefficient is in the last stage where choking conditions restrict the increase of the compressor output.

Mismatching of the compressor stages is also unavoidable if varying the rotor speed in proportion to the compressor output is resorted to in order to maintain the design flow coefficient of the first stage. For example, the rotor speed increases directly as the compressor output, whereas the first stage head, and the pressure and unit weight of the gas at the inlet to the second stage increase as the square of the speed. The flow coefficient of each subsequent stage decreases, the greatest decrease being in the last stage where stall conditions restrict the increase of the compressor output. If the compressor output and the rotor speed are decreased, the compression in the stages decreases and the flow coefficient increases through the stages. With the last stage choked, the coefficient of flow therethrough is at its maximum and cannot increase any more. Therefore, further reduction of the rotor speed causes the first stage flow coefficient to decrease until a rotating stall occurs in the first stage whereby the range of the rotor working speeds is restricted.

Thus, the increasing mismatching of the compressor stages due to the effect of gas compressibility in the process of compression restricts the range of the compressor output and the range of the rotor speed, the restriction being engendered on the one hand by choking conditions and on the other hand by stalling conditions in one of the compressor stages.

The effect of gas compressibility increases with the compression ratio (the ratio of the delivery pressure to the suction pressure). Therefore, the higher the delivery pressure, the narrower the working range of a multistage axial compressor.

The mismatching of the stages of a multistage axial compressor will be brought to a minimum, provided that the compressor output and the rotor speed vary in such a manner as to maintain the design flow coefficient of the middle stage. Under such conditions, the compressor performance curve showing the relation of the delivery pressure to the compressor output approximates to a parabolic line. When a compressor is used in a gas turbine installation, the performance curve showing the relation of the delivery pressure to the output is most nearly parabolic and it is this feature that renders axial compressors most suitable for use in gas turbine engines.

However, with a high compression ratio the working range of axial compressors becomes so narrow that the rotating stall occurring in the first stages of the compressor at low rotor speeds makes it impossible to start the engine without recourse to special means.

With compression ratios up to 8–12, recourse is made to blowing off air after the compressor intermediate stage in order to increase the flow through the first stages, decrease the associated angle of incidence and eliminate rotating stall. Alternatively, the pitch of the inlet guide vanes is altered so as to change the direction of the air flow and the angle of incidence on the first-stage vanes. With compression ratios above 8–12, these measures do not suffice and recourse is made to a two-spool compressor layout the principle of which consists in the following:

Inasmuch as the rotating stall in the first stage at a low rotor speed entails the choking of the last stage restricting the rate of flow through the compressor, it is desirable that during the starting of a gas turbine installation the first and last compressor stages run at different rotational speeds. Then, increasing the speed of the last stage rotor with unchanged output will decrease the flow coefficient of the last stage, eliminate choking and permit of further increasing the output. At the same time, decreasing the speed of the first stage rotor will increase the first stage flow coefficient, thereby diminishing the angle of incidence on the first stage and eliminating the rotating stall.

A method of regulating the output of a multistage, two-spool, axial compressor with two telescopically mounted turbine shafts is known. Each of the turbines runs at a variable speed and drives the respective compressor spool. Regulation is effected by varying the rotational speeds of the first and second spools, the speed increment of the second spool being greater than that of the first spool in virtue of the appropriate turbine power balance. This regulation decreases mismatching of the stages of the first and second spools during starting and at off-design operating conditions. In connection with a multistage axial compressor used in a gas turbine installation, such regulation decreased mismatching of the compressor stages and wides the range of working conditions.

The advanced variation of the second spool rotational speed allows of increasing the flow through the stages of the first spool and the low coefficient of the first stages, which provides design angles of incidence and shifts the limit of rotating stall into the area of lower rotational speeds. Yet, the widening of the working range of a two-spool compressor does not result in obtaining a wide range of output variation because the latter remains substantially narrow with a high compression ratio.

The narrow working range of multistage axial compressors is a disadvantage in connection with gas turbine installations and a still greater disadvantage as regards the employment of said compressors in other industrial applications. Therefore, it is an urgent problem today to provide for varying compressor output over a wide range, particularly at the required constant delivery pressure.

The generally known method of regulation by varying the speed of the rotor, or two rotors in a two-spool layout, gives only a limited range of output variation. For example, in the case of axial compressors with a moderate compression ratio of 3–4.5 the range of output variation at a constant delivery pressure is only 20–25 percent of the maximum output, this figure decreasing with increasing compression ratio.

Moreover, this method suffers from such disadvantages as drive losses and difficulty of turning the vibration of the compressor vanes in a wide range of rotational speeds.

For this reason the development of the methods of regulating the output of the axial compressors employed in the industry has tended towards wide-range regulation of compressor output at a constant rotor speed. With a constant-speed rotor running, drive can be effected by the use of an electric motor, which is conductive to operating economies.

Also known in the art is a method of regulating the output of a constant-speed axial compressor by bleeding some of the delivery to a recuperative turbine mounted on the shaft of said compressor, which recuperative turbine returns to the compressor shaft the energy expended in compressing the bled delivery, thereby rendering the regulation of the compressor output more economical. However, this method has not been accepted widely, since from the economy viewpoint, it is inferior to the method of regulating the output of an axial compressor by changing the pitch of the stator vanes.

The method of regulating the output of a multistage axial compressor at a constant rotational speed by changing the pitch of the stator vanes is most economical and is used nowadays by all the leading turbine manufacturers.

There is known a method of regulating the output of an industrial multistage axial compressor by changing the pitch of the stator vanes.

With this method, the pitch of the stator vanes is changed so as to provide optimum angles of incidence or attack in the compressor stages in off-design operating conditions. This expedient reduces or fully eliminates mismatching of the compressor stages in varying the compressor output and provides a wide range of regulating the compressor output. Changing the pitch of the stator vanes alters the angular direction of the issuing flow, i.e. alters the peripheral speed component of the flow at the inlet to the next rotor wheel, whereby variation is caused in the angle of incidence or attack and in the head of the compressor stage being regulated. The angles of the vanes generally differ between the stages of a multistage compressor because of different amounts of mismatching. The number of regulated stages increases with the range of output regulation, covering, as a rule, 40 to 100 percent of the stages on industrial axial compressors.

Changing the pitch of only the inlet guide vanes, frequently resorted to in the axial compressors of gas turbine engines to guard against rotating stall in starting the engine, or prime moved provides an insufficient range of regulation of the compressor output at a constant rotor speed and, therefore, this method is not used in connection with industrial axial compressors.

In a multistage axial compressor comprising variable-pitch stator vanes, the vanes are mounted in a bearing supported by a bearing support installed inside the compressor casing and forming the periphery of the blading. To the root end of each vane is rigidly attached a pitch control lever the other end of which has a pin fitting into a circular groove in a cylindrical sleeve and adapted to move in said groove during the movement of said cylindrical sleeve. The cylindrical sleeve is located inside the compressor casing between the bearing support and the inside of the casing and is kinematically connected to a servomotor designed to move it axially. The movement imparted to the cylindrical sleeve causes the pitch control lever pins to move and thereby turn the vanes about their axes, changing the vane pitch.

The method of regulating the output of a multistage axial compressor at a constant rotor speed by changing the pitch of the stator vanes meets the working requirements of industrial compressors, but it complicates compressor construction and causes increase in manufacturing labour and materials. Furthermore, cost is raised by the employment of the vane pitch change mechanism which comprises a large number of precision elements which have to be carefully manufactured, assembled and adjusted. A still further disadvantage is poor operating reliability: wear and seizure of even one variable-pitch vane will necessitate compressor repairs.

Endeavour to carry into effect the same principle of regulation by simpler constructional means has brought about a method of regulating compressor output by rotating the inlet guide vanes. By this method, changing the direction of the flow or the peripheral component of the flow velocity is obtained by imparting the flow the transfer speed of the rotation of the inlet guide vanes, the speed of vane rotation being chosen so as to provide the optimum angle of incidence of the rotor wheel blades. The arrangement for carrying this method into effect comprises inlet guide vanes positioned before the rotor wheel and mounted on a sleeve installed on a shaft coaxial with the wheel shaft. The inlet guide vane assembly is driven, for example, by a controllable hydraulic motor which rotates the inlet guide vane assembly at different speeds in the forward and reverse directions relative to the wheel shaft. This produces variation in the peripheral component of the flow velocity and in the angular direction of the flow at the inlet to the wheel, whereby the operation of the compressor is regulated.

The effect of varying the peripheral component of the flow velocity and the angular direction of the flow downstream of a vane row rotating at variable speed has found use for regulating fans comprising two coaxial impellers rotating in opposite directions, the regulation being effected by changing the rotational speed of at least one of the impellers.

However, the employment of rotating guide vanes in multistage axial compressors makes the compressor construction still more complicated than in the case of the variable pitch vanes, there being a rotor and a stator rotating simultaneously. The need for each of the guide vane assemblies to run generally at its own speed complicates the compressor construction still further. The construction of a multistage axial compressor can be simplified by using one rotating inlet guide vane row, but, as stated above, this means is not sufficient to obtain a wide range of output regulation.

Thus, in the prior art, the economical methods of widerange regulation of the output of multistage axial compressors entail substantial complication of the compressor construction.

SUMMARY OF THE INVENTION

It is an object of the present invention to provide a method of wide-range regulation of the output of a multistage axial compressors by producing variable boost in a compressor operating at a constant rotor speed.

It is a further object of the present invention to provide a multistage axial compressor of simple and reliable construction for carrying into effect said method of wide-range regulation of compressor output.

It is a still further object of the present invention to provide for economical compressor operation on the whole by virtue of reducing the power of a variable-speed drive motor.

It is a still further object of the present invention to decrease the overal dimensions of the compressor as well as the labour and materials required for the manufacture thereof, and to increase compressor operating reliability by virtue of a simple construction.

These and other objects are achieved by providing a method of regulating the output of a multistage axial compressor, which compressor has two coaxial rotors in series, by varying the head of the medium entering the compressor stages. According to the invention, the variation of the head of the medium is effected, after the medium leaves the stator, by changing the rotational speed of the first rotor, the rotational speed of the second rotor being kept constant.

Such a method provides a variable boost in the compressor. With the stages of the second rotor rotating at a constant speed, the limits of their volumetric flow are constant. These limits are determined by the choking of the last stage at the maximum volumetric flow and by the surge boundary at the minimum volumetric flow.

By varying the unit weight of the gas at the inlet to the stages of the second rotor, a proportional change in the compressor weight flow is effected. The variation of the unit weight of the gas is obtained by changing the rotational speed of the stages of the first rotor.

Increase in the speed of the first rotor brings about increase in the pressure and unit weight of the gas at the inlet to the stages of the second rotor, which entails increase in the weight flow of the compressor. Under these conditions choking of the last stage of the second rotor does not prevent the increase in the compressor weight flow, inasmuch as the increase in the unit weight of the gas, even at a constant maximum volumetric flow through the stages of the second rotor, entails increase in the compressor weight flow.

With this method, the limits of regulating the weight flow are determined, on the one hand, by the maximum boost, i.e. the maximum speed of the first rotor at the maximum volumetric flow through the stages of the second rotor, and on the other hand, by the minimum volumetric flow through the stages of the second rotor at the minimum boost.

To ensure uninterrupted flow, the range of regulating the output from the stages of the first rotor must correspond with the range of regulating the compressor weight flow, the volumetric flow through the stages of the second rotor varying from maximum to minimum.

Under these conditions the ratio of compression in the stages of the second rotor increases and therefore, in order to maintain constant compressor delivery pressure, the curve for the performance of the stages of the first rotor, i.e. the relation of the delivery pressure to the output, is nearly parabolic. So the mismatching of the stages of the first rotor is at a minimum, which provides for maintaining high efficiency over a wide range of compressor output regulation.

It is desirable that the second rotor be arranged to rotate in a direction opposite to that of the first rotor. This widens the range of compressor output regulation by virtue of varying the boost downstream of the first stage of the second rotor, which rotor runs at a constant speed, by using the effect of varying the peripheral component of the flow velocity and the angular direction of the flow downstream of the last wheel of the first rotor for the purpose of changing the head of the first stage of the second rotor.

It is further desirable that the head produced by the stages of the first rotor be 15–25 percent of the head produced by the stages of the second rotor.

This provides the required range of regulating the output of industrial multistage axial compressors, with the minimum power of the motor driving the first rotor.

It is still further desirable that the rotor can be arranged in series inside the compressor casing, the first rotor being connected to a variable-speed drive motor and the second rotor being connected to a constant-speed drive motor.

This constructional arrangement provides for driving the first rotor at a variable speed and the second rotor at a constant speed. Varying the speed of the first rotor causes change in the pressure and unit weight of the gas at the inlet to the stages of the second rotor, i.e. varies the stage boost, thereby effecting the regulation of the weight flow through the stages of the second rotor as well as through the entire compressor.

It is necessary that the number of the stages of the first rotor, for the given range of the output regulation, should correspond with the minimum power of the variable-speed drive motor.

It is known that changing the speed of a drive motor inevitably brings about additional losses of power at off-design operating conditions. The use of the appropriate number of the stages of the first rotor reduces the total loss of power in the compressor drive motors, thereby making the method of regulating the output of a multistage axial compressor more economical.

The minimum power of the variable-speed drive motor is limited by the preset range of compressor output regulation determined by the boost produced by the stages of the first rotor, i.e. by the optimum number of the stages of the first rotor.

Increasing the number of the stages of the first rotor beyond the optimum results in increasing the loss of power of the compressor drive motors. Decreasing the number of the stages beyond the optimum reduces the range of compressor output or flow control regulation.

It is necessary that the last stage of the first rotor should comprise only one rotor wheel following which is located the first-stage wheel of the second rotor.

This constructional arrangement of the last stage of the first rotor makes it possible to benefit from the contrarotation of the rotors for the purpose of widening the range of compressor output or flow control regulation.

The widening of the range of compressor output regulation, with a limited power of the variable-speed drive motor, can be achieved by virtue of increasing the boost downstream of the first stage of the second rotor, which rotor runs at a constant speed, by increasing the peripheral velocity and the angle of the flow downstream of the last stage of the first rotor for the purpose of raising the head of the first stage of the second rotor.

Increasing the speed of the first rotor causes an increase in the boost produced by the stages thereof and also increases the peripheral component of the flow velocity at the inlet to the first wheel of the second rotor, in the direction opposite to its rotation. This causes increase in the angle of incidence of angle of attack of the vanes and in the head produced in the first stage of the second rotor at a constant rotor speed, whereby the boost in the other stages of the second rotor is increased and the range of compressor output regulation is widened.

If both rotors are driven in the same direction, increase in the speed of the first rotor would bring about decrease in the peripheral component of the flow velocity at the inlet to the first stage of the second rotor, in the direction opposite to its rotation, which would reduce the head, with the boost produced by the stages of the first rotor increasing. Under these conditions, the boost downstream of the first stage of the second rotor would decrease with consequent narrowing of the range of compressor output or flow control regulation.

This disadvantage is eliminated by the expedient of running the second rotor opposite to the direction in which the first rotor runs.

It is desirable that the first-stage wheel of the second rotor and at least the last-stage wheel of the first rotor be cantilever-mounted. This constructional arrangement provides an optimum axial distance between the wheels for the purpose of fully benefiting from the variation of the peripheral component of the flow velocity.

It is recommended that a.c. motors of a known construction be used to drive the first and second rotors, the motors being arranged so that during starting the motor of the second rotor is connected to a frequency converter inserted in a constant-frequency alternating current circuit, whereas during the operation of the compressor the motor of the second rotor is connected to said constant-frequency alternating current circuit, said motor of the first rotor being connected to said frequency converter both during starting and operation of the compressor.

By making connections as described above, the speed of the first rotor drive motor can be varied during operation, thereby effecting the regulation of compressor output. The use of the starting frequency converter of the second rotor drive motor for changing the speed of the first rotor drive motor reduces the number and cost of the compressor drive elements.

The use of electrical motors gives such advantages as high economy of operation, simple maintenance, smaller floorspace for the installation of the compressor and drive, and also the feasibility of locating the compressor in proximity to the compressed gas consumer, thereby shortening the gas lines and reducing losses therein. The power of the starting frequency converter is, as a rule, 15–25 percent of the motor power, which corresponds with the head which is produced by the stages of the first rotor and is equal to 15–25 percent of the head produced by the stages of the second rotor.

BRIEF DESCRIPTION OF THE DRAWINGS

Now the invention will be described in detail with reference to the accompanying drawings in which.

DESCRIPTION OF THE PREFERRED EMBODIMENTS

Figure 1:
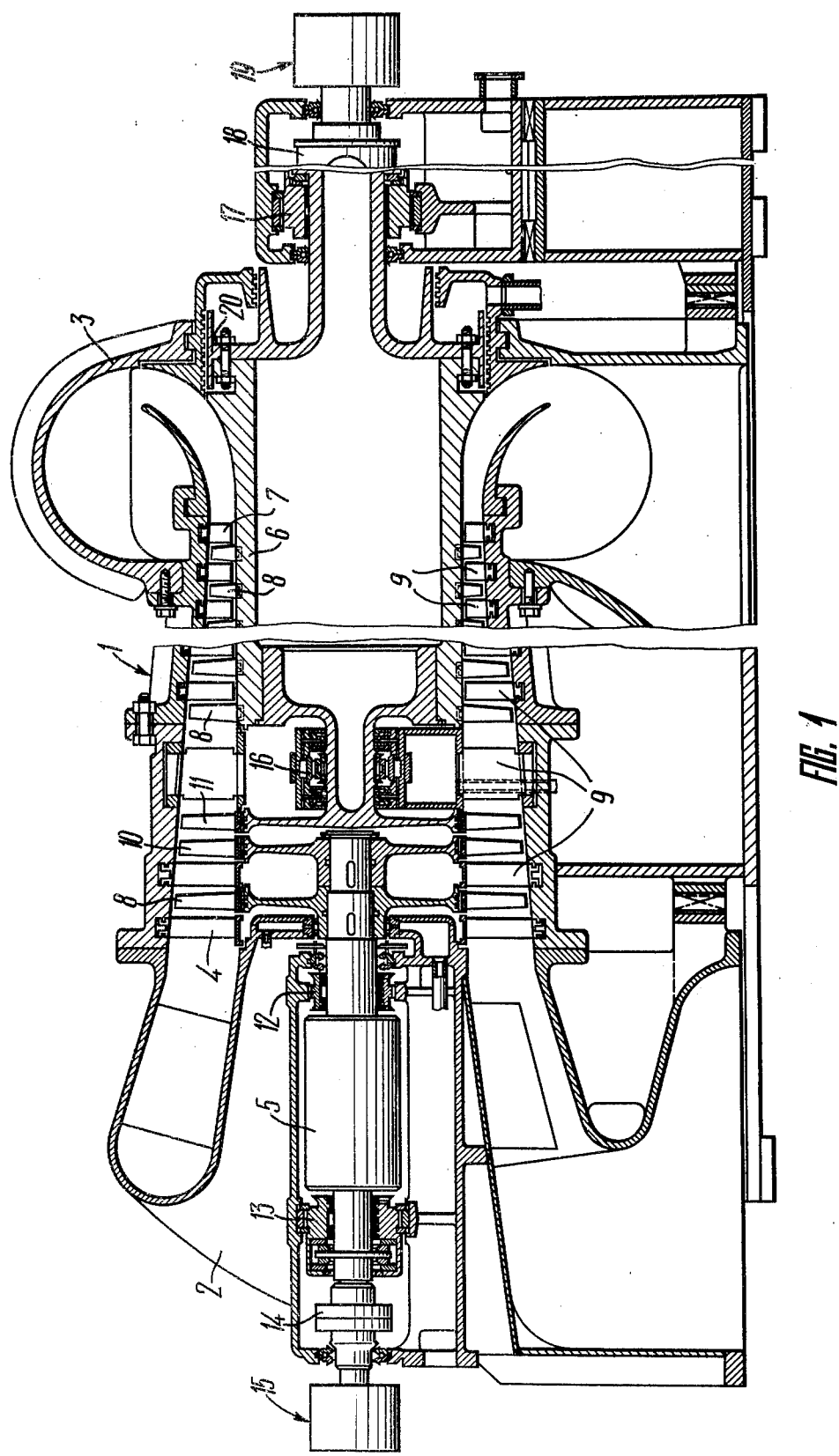
FIG. 1 is a longitudinal sectional view of the compressor constructed according to the invention.

A multistage axial compressor comprises a casing 1 (FIG. 1) which has a suction or inlet duct 2 to supply gas to the compressor blading, and a discharge or outlet duct 3 to supply compressed gas to the consumer. The compressor blading is formed by inlet guide vanes 4 located aft of the suction duct 2, the stages of a first rotor 5, the stage of a second rotor 6, and straightener vanes 7 are designed to eliminate the peripheral component of the compressed air velocity at the inlet of the discharge duct 3.

The inlet guide vanes 4 direct the gas flow at the required angle into the first wheel 8 of the rotor 5. Each rotor stage includes a rotor wheel 8 and stator vanes 9.

The last stage of the first rotor 5 includes only one rotor wheel 10. The rotor wheels 8 and 10 are cantilever-mounted on the rotor 5. The first-stage wheel 11 of the second rotor 6 is located downstream of the rotor wheel 10 and is cantilever-mounted on the rotor 6. The cantilever mounting of the rotor wheels 10 and 11 provides an optimum axial distance therebetween for the purpose of fully allowing for the variation of the peripheral component of the flow velocity. The rotor 5 is mounted in a radial bearing 12 and in a radial-thrust bearing 13 which is adapted to take the rotor axial load. The rotor 5 is connected by a coupling 14 to a variable-speed drive motor 15. The rotor 6 is mounted in a radial bearing 16 and in a radial-thrust bearing 17 which is adapted to take the rotor axial load. The rotor 6 is connected by a coupling 18 to a constant-speed drive motor 19. The rotor 6 is of built-up construction and is provided with a thrust unloader 20 for the purpose of relieving the bearing 17 of the axial thrust. The bearing 16 is located inside the compressor and is rigidly mounted in the casing 1 through an intermediate assembly of stator vanes 9 provided in the first stage of the rotor 6. The rotors 5 and 6 are located coaxially and in series. The head produced by the stages of the rotor 5 is equal to 15–25 percent of the head produced by the stages of the rotor 6. The number of the stages of the rotor 5 is chosen so as to provide the abovesaid head at the minimum power of the drive motor 15 in order to minimize the total power losses in the drive motors 15 and 19.

Figure 2:
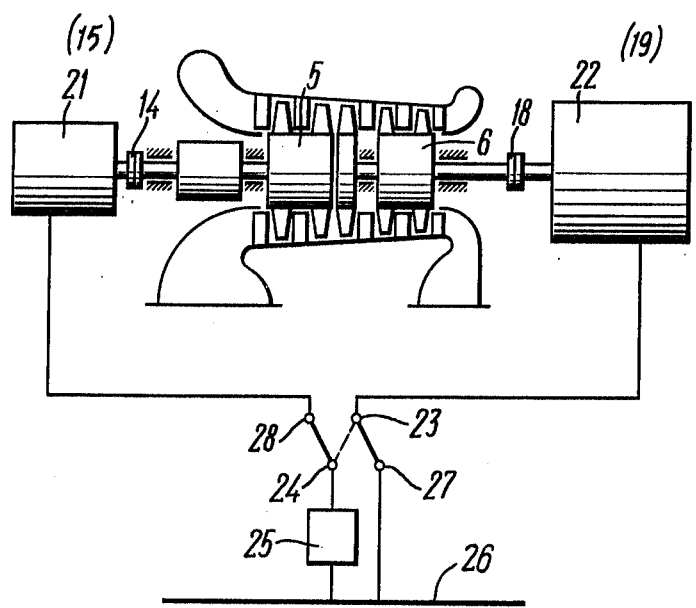
FIG. 2 is a wiring diagram showing the connections of the motors.

Referring to FIG. 2, the first rotor 5 is driven by a motor 21 of a known construction and the second rotor 6 is driven by a motor 22 of a known construction. The connections of the drive motors are arranged in such a manner that during starting the motor 22 of the rotor 6 is connected through terminals 23 and 24 to a frequency converter 25 inserted in a constant-frequency alternating current circuit 26, whereas during the operation of the compressor the motor 22 is connected through terminals 23 and 27 to the constant-frequency alternating current circuit 26. The motor 21 is connected through terminals 28 and 24 to the frequency converter 25 both during starting and operation of the compressor.

The compressor operates as follows:

During starting the motor 22 is connected through the terminals 23 and 24 to the frequency converter 25, whereby the frequency of the alternating supply to the motor 22 is raised.

When the output from the frequency converter 25 has reached the frequency of the alternating current in the circuit 26, i.e. 50/60 Hz, the motor 22 is connected through the terminals 23 and 27 to the circuit 26 and the terminals 23 and 24 open. The speed of the motor 22 and of the rotor 6 reaches the rated value $n_2$ and remains constant at all the compressor operating conditions due to the constant frequency of the circuit 26.

Thereafter the motor 21 is connected through the terminals 28 and 24 to the frequency converter 25, whereby the output frequency of the converter 25 is raised. The speed of the motor 5, which motor is connected by the coupling 14 to the motor 21, increases until it reaches the rated value $n_1$. The output frequency of the converter 25 becomes appropriate to the rated speed $n_1$ of the rotor 5.

The compressor attains the rated output when the following rated values have been reached: the rated speed $n_1$ of the rotor 5, the rated speed $n_2$ of the rotor 6, the rated delivery pressure P. The rated operating conditions are represented by the point 29 (FIG. 3) on the compressor performance graph which depicts the compressor delivery pressure P versus the ratio $G/G_{max}$ of the compressor output to the compressor maximum output at the constant speed $n_2$ of the rotor 6, at a number of the constant speeds $n_1$ of the rotor 5 (full-line curves). At each given speed of the rotor 5 the relation of the pressure P to the output is a curve bounded at one end by the maximum output determined by the choking of the compressor last stage, as depicted by the vertical portion of the curve, and at the other end by the minimum output at the surge limit, determined by stall in the compressor last stage if the speed of the rotor 5 is below the rated value or by stall in the first stage of the rotor 6 if the speed of the rotor 5 is above the rated value.

The pressure P versus the output ratio $G/G_{max}$, at the limit of the compressor surge, with the varying speed $n_1$ of the rotor 5, is shown in the graph by the curve 32 (FIG. 3) which bounds the area of the compressor working conditions.

The broken lines on the graph are the lines of equal adiabatic compression efficiency $\eta$ in effecting the regulation of the compressor output by varying the speed $n_1$ of the rotor 5.

For the rated operating conditions the compressor output and the speed of the first rotor 5 are chosen between the minimum and the maximum values. The gas on the suction side enters the suction duct 2 and is directed by the guide vanes 4 into the stages of the first rotor 5 where it becomes compressed. After the last stage of the first rotor 5, which last stage consists of the rotor wheel 10, the pressure, unit weight and peripheral velocity component of the flow reach the rated values at which an optimum angle of incidence is obtained in the first stage 11 of the second rotor 6, which first stage 11 compresses the gas to the rated values of the pressure and unit weight at the inlet to the other stages of the second rotor 6, the volumetric flow through these stages being chosen between the maximum determined by the choking of the last stage and the minimum determined by the surge limit of said stages. The gas compressed to the rated delivery value passes through the straightener vanes 7 into the discharge duct 3 and therefrom to the consumer.

To increase the compressor output, the frequency of the alternating current is raised by the use of the frequency converter 25, whereby the speed of the motor 21 and of the rotor 5 is increased.

At a constant compressor delivery pressure, speeding up the first rotor 5 to the maximum value causes maximum increase in the pressure and unit weight of the gas and in the peripheral component of the flow velocity at the inlet to the first-stage wheel 11 of the second rotor 6 in the direction opposite to its rotation. This brings about maximum increase of the angle of incidence and the head in this stage, due to which the pressure and the unit weight of the gas, or the boost after the first stage of the second rotor 6, reach a maximum. The volumetric flow through the other stages of the second rotor 6 reaches a maximum, which provides for the maximum output of the compressor. On the performance graph (FIG. 3) the maximum output conditions are represented by the point 30 which shows the relation of the pressure P to the output ratio $G/G_{max}$ at the maximum speed $n_1$ of the first rotor 5 (3600 rpm).

To decrease the compressor output, the frequency of the alternating current is lowered by the use of the frequency converter 25, whereby the speed of motor 21 and of the rotor 5 is slowed down. Minimizing the speed of the rotor 5 at a constant compressor delivery pressure decreases to the minimum values the pressure and the unit weight of the gas, and the peripheral component of the flow velocity at the inlet to the first-stage wheel 11 of the second rotor 6 in the direction opposite to its rotation. This minimizes the angle of incidence and the head in this stage, with the result that the pressure and the unit weight of the gas, or the boost after the first stage of the second rotor 6 are at a minimum. The volumetric flow through the other stages of the second rotor 6 becomes minimum, whereby the minimum output of the compressor is established. The minimum output conditions are represented on the performance graph (FIG. 3) by the point 31 which shows the relation of the pressure P to the output ratio $G/G_{max}$ at the minimum speed $n_2$ of the first rotor 5 (1500 rpm).

With varying compressor output and constant delivery pressure, the relation of the pressure downstream of the stages of the first rotor 5 to the output of these stage is nearly parabolic, which provides for the minimum of mismatching and for maintaining high efficiency of said stages. Therefore, variation of the adiabatic compression efficiency in regulating compressor output is determined mainly by the mismatching of the stages of the second rotor 6. Since the maximum volumetric flow through these stages at which choking of the last stage occurs is characterized by sharp decrease in the efficiency of the stages of the rotor 6, it is recommended that in designing the maximum compressor output some margin be provided for these stages at the boundary of the choking conditions with regard to the volumetric flow. The amount of this margin is determined by the minimum efficiency at the conditions of the compressor maximum output.

To ensure proper operation of the compressor in the given regulation range, a margin should be provided at the surge limit 32 (FIG. 3) with regard to the compressor minimum output. At the conditions represented by the point 31 the volumetric flow through the stages of the second rotor 6 is chosen with the appropriate margin for the surge-producing volumetric flow through said stages.

Figure 3:
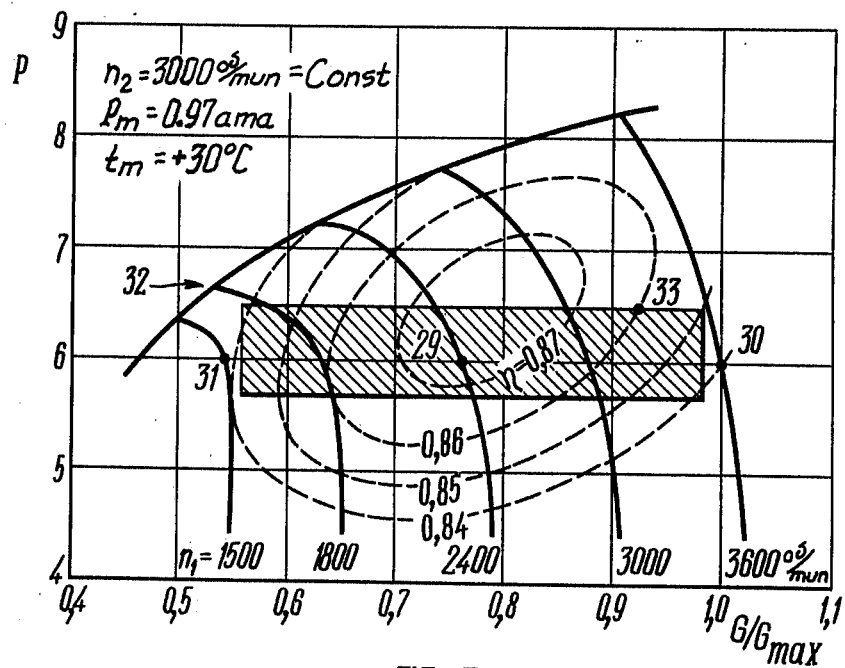
FIG. 3 is a graph of the performance curves of the compressor employing the method of output regulation according to the present invention.

In FIG. 3 the hatched rectangle shows the area of the working conditions for which the compressor is designed. As can be seen from the performance curves, the method of regulating compressor output in the required range of working conditions is sufficiently economical. Decrease in the adiabatic compression efficiency at the boundaries of the working range does not exceed 3 percent absolute.

Thus, the provision of an axial compressor in accordance with the present invention makes it possible:

To provide a wide range of output regulation or flow control at constant terminal pressure by virtue of varying the speed of the first rotor, the second rotor running at a constant speed in an opposite direction.

To use, as a main drive, an electric motor or another type of constant-speed drive.

To render the operation of the whole machine more economical by decreasing the power of the variable-speed drive motor 10 15-25 percent of the power of the main motor, by employing contrarotating rotors, and by provision of rotor wheels on the adjacent ends of the rotors without the use of an intermediate stator therebetween.

To decrease the overall dimensions of the compressor and the need for the labour and materials required for the manufacture thereof, and also to increase the operating reliability of the compressor by virtue of the simple construction thereof.

An axial compressor constructed according to the present invention and having two stages in the first rotor and nineteen stages in the second rotor, when operated at the following conditions: the speed of the first rotor 3300 rpm, the speed of the second rotor 3000 rpm, the initial temperature +30° C., the inlet pressure 0.97 atmosphere absolute, has the parameters stated below:

Volumetric flow 6340 m$^3$/min
Compressor delivery pressure P = 6.5 atm.abs
Adiabatic efficiency $\eta$ = 0.86

These parameters are represented by the point 33 on the graph (FIG. 3). The compressor output can be changed from 60 to 105 percent of the flow figure referred to, with the terminal pressure constant.

As compared with like compressors having variable-pitch inlet guide vanes, the compressor constituting the present invention has 1.5-2 times less weight and needs about 1.5 times less labour in manufacture.

What is claimed is:

1. An axial flow compressor comprising, two coaxial, axial flow rotors mounted in series as an upstream rotor and a downstream rotor for independent rotation, means mounting said two rotors for rotation independently of each other, a housing common to both rotors and having fixed stator vanes thereon, each rotor having fixed rotor vanes defining compression stages with said stator vanes for compressing a gaseous fluid, separate drive means for driving the two rotors independently at different speeds at a variable speed of the upstream rotor greater than a constant speed of the downstream rotor and in a direction for effecting an output head pressure in the upstream rotor within a range effective to provide for varying compressor volumetric output flow over a wide range at a given constant output delivery pressure of the compressor and while optomizing the power input of said drive means.

2. An axial flow compressor according to claim 1, in which the separate drive means comprises a variable speed motor for driving the upstream rotor and a constant speed rotor for driving the downstream rotor.

3. An axial flow compressor according to claim 1, in which a last stage of said upstream rotor comprises a single stage wheel and in which said first stage of the downstream rotor comprises a single stage wheel.

4. An axial flow compressor according to claim 1, in which said separate drive means comprise separate motors for driving the rotors in opposite directions with the downstream rotor being driven in a direction opposite to the direction the upstream rotor is driven.

5. A method of operating an axial flow compressor, the compressor comprising two coaxial, axial flow rotors mounted in series as an upstream rotor and a downstream rotor for independent rotation, means mounting the said two rotors, means mounting said two rotors for rotation independently of each other, a housing common to both rotors and having fixed stator vanes thereon, each rotor having fixed rotor vanes defining compression stages with stator vanes for compressing a gaseous fluid, separate drive means for driving the two rotors independently at different speeds with a variable speed of the upstream rotor greater than a constant speed of the downstream rotor and in a direction for effecting an output head pressure in the upstream rotor within a range effective to provide for varying compressor volumetric output flow over a wide range at a given constant output delivery pressure while optomizing the power input of said drive means; the method comprising, driving the upstream rotor at greater speeds than the speed of the downstream rotor while driving the downstream rotor at a constant speed and in a direction for effecting an output head pressure on the upstream rotor within a range effective to provide for varying compressor volumetric output pressure flow over a wide range at a given constant output delivery pressure of the compressor.

6. A method of operating an axial flow compressor according to claim 5, in which said output head pressure of the upstream rotor is about 15 to 25 percent of output head pressure of the downstream rotor.

7. A method of operating an axial flow compressor according to claim 6, in which said upstream is driven in a direction opposite to a direction in which said downstream rotor is driven.

* * * * *